US009146394B1

United States Patent
Brillhart

(10) Patent No.: US 9,146,394 B1
(45) Date of Patent: Sep. 29, 2015

(54) CLIP-ON EYE PIECE SYSTEM FOR HANDHELD AND DEVICE-MOUNTED DIGITAL IMAGERS

(71) Applicant: Optics 1, Inc., Bedford, NH (US)

(72) Inventor: Steven A. Brillhart, Chester, NH (US)

(73) Assignee: Optics 1, Inc., Bedford, NH (US)

( * ) Notice: Subject to any disclaimer, the term of this patent is extended or adjusted under 35 U.S.C. 154(b) by 0 days.

(21) Appl. No.: 14/088,409

(22) Filed: Nov. 24, 2013

Related U.S. Application Data

(60) Provisional application No. 61/736,575, filed on Dec. 13, 2012.

(51) Int. Cl.
*H04N 5/222* (2006.01)
*G02B 6/06* (2006.01)
*G09G 5/00* (2006.01)
*G02B 25/00* (2006.01)
*G02B 7/14* (2006.01)
*H04N 5/232* (2006.01)

(52) U.S. Cl.
CPC ............... *G02B 25/001* (2013.01); *G02B 7/14* (2013.01); *H04N 5/23293* (2013.01)

(58) Field of Classification Search
CPC .......... H04N 5/23293; H04N 5/23209; H04N 5/7491; G03B 13/00; G03B 13/02; G03B 17/56; G03B 17/566; G03B 17/568; G03B 27/01; G03B 27/0179; G03B 27/017; G02B 23/00–23/26
USPC ........................................ 348/333.01–333.13
See application file for complete search history.

(56) References Cited

U.S. PATENT DOCUMENTS

| 6,043,934 | A  | * | 3/2000  | Hirunuma et al. ............ 359/557 |
|-----------|----|---|---------|---------------------------------------|
| 6,288,386 | B1 | * | 9/2001  | Bowen et al. ............ 250/214 VT   |
| 6,689,050 | B1 | * | 2/2004  | Beutter et al. ................ 600/117 |
| 7,133,608 | B1 | * | 11/2006 | Nagata et al. ................ 396/374  |
| 7,170,557 | B2 | * | 1/2007  | Manico et al. ............ 348/333.07   |
| 7,541,581 | B2 |   | 6/2009  | Reed et al.                             |
| 8,040,422 | B2 | * | 10/2011 | Takeuchi ................ 348/333.06     |
| 8,984,665 | B2 | * | 3/2015  | Celona et al. ...................... 2/6.2 |
| 2003/0076440 | A1 | * | 4/2003 | Terane .......................... 348/373 |
| 2006/0290451 | A1 | * | 12/2006 | Prendergast et al. ......... 335/205 |
| 2009/0050806 | A1 | * | 2/2009 | Schmidt et al. ............... 250/332 |
| 2009/0084956 | A1 | * | 4/2009 | Gat ........................... 250/338.1 |
| 2010/0245585 | A1 | * | 9/2010 | Fisher et al. .................. 348/164 |
| 2010/0299814 | A1 | * | 12/2010 | Celona et al. ..................... 2/422 |
| 2011/0145981 | A1 | * | 6/2011 | Teetzel et al. ...................... 2/422 |
| 2011/0174979 | A1 | * | 7/2011 | Garman et al. ............... 250/352 |
| 2012/0188660 | A1 | * | 7/2012 | Fahlbusch et al. ............ 359/824 |
| 2012/0293701 | A1 | * | 11/2012 | Tobinaga et al. ........ 348/333.01 |
| 2013/0076963 | A1 | * | 3/2013 | Sirpal et al. ............. 348/333.05 |
| 2013/0076964 | A1 | * | 3/2013 | Sirpal et al. ............. 348/333.12 |

(Continued)

*Primary Examiner* — Chia-Wei A Chen
(74) *Attorney, Agent, or Firm* — Downs Rachlin Martin PLLC

(57) ABSTRACT

A clip-on eyepiece system that enables a single portable digital imager to be used in both handheld and device-mounted applications is disclosed. The system has a clip-on eyepiece assembly that includes an inverting or a non-inverting eyepiece, a clip-on bracket, a T-mount, and a magnet. The digital imager comprises a display, a mounting rail, a Hall-effect sensor, and a processor all configured to dynamically determine which type of eyepiece, if any, is attached, and to dynamically set system parameters to configure the digital imager for use in either a handheld or a mounted mode. A method for setting operational parameters when the user attaches or detaches the clip-on eyepiece assembly is also disclosed.

18 Claims, 4 Drawing Sheets

(56) References Cited

U.S. PATENT DOCUMENTS

| | | | |
|---|---|---|---|
| 2013/0083228 A1* | 4/2013 | Iwatani | 348/333.01 |
| 2013/0120635 A1* | 5/2013 | Kim et al. | 348/333.06 |
| 2013/0278631 A1* | 10/2013 | Border et al. | 345/633 |
| 2014/0176775 A1* | 6/2014 | Ichikawa et al. | 348/333.05 |
| 2014/0184476 A1* | 7/2014 | McHale et al. | 345/8 |
| 2014/0255016 A1* | 9/2014 | Kim et al. | 396/55 |
| 2014/0290113 A1* | 10/2014 | Thomas et al. | 42/114 |
| 2014/0319217 A1* | 10/2014 | Elefante | 235/407 |
| 2014/0379103 A1* | 12/2014 | Ishikawa et al. | 700/56 |
| 2015/0034080 A1* | 2/2015 | Furuichi et al. | 128/201.19 |
| 2015/0037775 A1* | 2/2015 | Ottensmeyer et al. | 434/271 |
| 2015/0049115 A1* | 2/2015 | Oikawa et al. | 345/633 |
| 2015/0084900 A1* | 3/2015 | Hodges et al. | 345/173 |
| 2015/0085059 A1* | 3/2015 | Fisher et al. | 348/14.02 |
| 2015/0085157 A1* | 3/2015 | Yamaguchi et al. | 348/223.1 |

* cited by examiner

CLIP-ON EYE PIECE SYSTEM FOR HANDHELD AND DEVICE-MOUNTED DIGITAL IMAGERS

CROSS-REFERENCE TO RELATED APPLICATIONS

This application claims the benefit of priority under 35 U.S.C. §119(e) of U.S. Provisional Application Ser. No. 61/736,575, filed on Dec. 13, 2012, and which is incorporated by reference herein.

FIELD

The present disclosure relates generally to digital imagers and objective lens eyepieces, and more particularly to an attachable and detachable clip-on eyepiece system that can enable a single portable digital imaging device to be used in both handheld and device-mounted modes.

BACKGROUND

Conventional portable digital imagers, such as clip-on thermal imagers (COTIs), are designed for use in either a handheld mode or an attached mode (such as when attached to night-vision goggles (NVG)), but not both. When a portable digital imager is attached to a device such as an NVG (hereinafter referred to as the mounted mode), the optical eyepiece or digital display that presents an image to the user is typically positioned too far from the eye to enable the user to easily use the device in the handheld mode, especially when the user is wearing eyeglasses or ballistic goggles. This limits the flexibility of conventional portable digital imagers and requires users who may need to use an imager in both the mounted and handheld modes to carry multiple devices.

In addition, conventional portable digital imagers are typically optimized for use in either the handheld or mounted mode. For example, owing to different distances of the display from the user's eye, the user might prefer different display brightnesses depending on whether the digital imager is mounted or handheld. A user who attempts to use an imager in both modes might therefore need to manually adjust system settings such as brightness when changing modes. Moreover, while manually adjusting the system settings, the user is unable to use the digital imager for visual augmentation, and can therefore fail to detect relevant objects during this adjustment period.

Furthermore, conventional digital imagers that use optical eyepieces are designed to use either inverting or non-inverting eyepieces, but not both. The user of a conventional digital imager who wishes to replace a heavier and bulkier non-inverting eyepiece with a lighter and smaller inverting eyepiece must also replace the digital imager with one that digitally inverts the image.

Therefore, there is a need for an eyepiece that can enable a portable digital imager, to which the eyepiece can be easily attached and from which it can be easily detached, to be used in both mounted and handheld modes.

SUMMARY

An aspect of the disclosure is a clip-on eyepiece system that enables a single portable digital imager to be used in both handheld and device-mounted applications. The clip-on eyepiece system comprises a clip-on bracket with an integrated magnet, and a digital imager with an integrated Hall-effect sensor. When the clip-on bracket, to which a clip-on eyepiece is attached, is mounted on the digital imager, the magnet in the bracket comes into close proximity to the Hall-effect sensor in the digital imager. This mechanism enables the digital imager to determine in real time and without the need for manual adjustment whether an eyepiece is attached, and to configure the digital imager for use in either a handheld or a mounted mode.

Additional features and advantages are set forth in the Detailed Description which follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The entire disclosure of any publication or patent document mentioned herein is incorporated by reference.

The present disclosure relates generally to objective lens eyepieces, and more particularly to an attachable and detachable clip-on eyepiece system that can enable a single portable digital imaging device to be used in both handheld and device-mounted modes.

Figure 1:
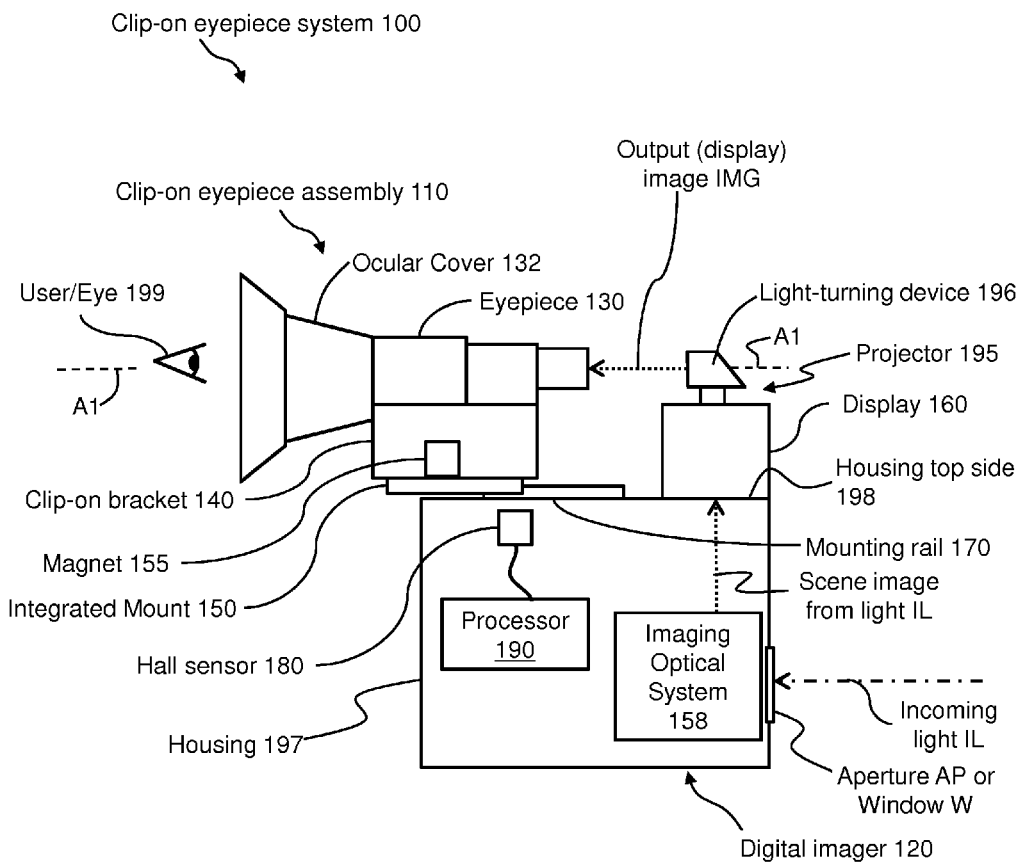
FIG. 1 is a block diagram of an example clip-on eyepiece system according to the disclosure showing a clip-on eyepiece assembly mounted to a digital imager.

FIG. 1 is a block diagram of a clip-on eyepiece system 100 according to one embodiment. The clip-on eyepiece system 100 comprises a clip-on eyepiece assembly 110 and a digital imager 120. The clip-on eyepiece assembly 110 comprises an eyepiece 130, a clip-on bracket 140 with an integrated mount 150 (e.g., a T-mount), and a magnet 155. The digital imager 120 comprises imaging optical system 158 operably connected to a display 160, a mounting rail 170, a magnetic sensor 180 (hereinafter, Hall-effect sensor 180), a processor 190, and a projector 195. Digital imager includes a housing 197 with a top side 198. Processor 190 is operably connected to Hall-effect sensor 180, which is arranged at or adjacent (but preferably within) housing top side 198 where mounting rail 170 resides. Display 160 also resides adjacent housing top side 198 and adjacent clip-on bracket 40 and eyepiece 140. This configuration places a light-turning device 196 and eyepiece 30 along a common optical axis A1, thereby placing display 160 in optical communication with eyepiece 130. FIG. 1 also shows a user or user's eye 199 looking into an ocular cover 132 of eyepiece 130.

In the operation of clip-on eyepiece system 100, incoming light IL enters the digital imager 120 at imaging optical system 158 through an aperture AP or window in housing 197. Imaging optical system 158 forms from incoming light IL an image, which is displayed on display 160. Projector 195 is arranged relative to display 160 and creates an output image IMG based on the display image, and injects the output image IMG into the eyepiece 130. Projector 195 includes or is operably arranged adjacent the light-turning device 196 (e.g., a light turning member, such as a mirror) to facilitate injecting the output image IMG into the eyepiece 130. The incoming light IL is, for example, light in the visible, infrared, or ultraviolet spectrum. The output image IMG is viewed, via the eyepiece 130, by an eye 199 of the user.

The eyepiece 130 can be any conventional inverting or non-inverting eyepiece. Optical eyepieces, such as the eyepiece 130, can be designed to be either inverting or non-inverting. A non-inverting eyepiece (also known as a relay lens) has the advantage of requiring smaller, fewer, and more lightweight lens elements, but has the disadvantage of presenting the user with an upside-down image, which must then be inverted by other means. An inverting eyepiece has the advantage of presenting the user with an image that is right-side up, but has the disadvantage of requiring larger, more numerous, and heavier lens elements, thereby making the device less portable. When a digital imager uses a non-inverting eyepiece, the imager must invert the image by some other means in order to present the user with an image that is right-side up. Typically, the image that enters the eyepiece is inverted digitally. In other words, the digital imager displays an upside-down image that appears upright when viewed through the non-inverting eyepiece.

In an example, the clip-on bracket 140 is formed from a durable material such as aluminum or stainless steel. The magnet 155 can be any conventional magnet that is appropriately sized to its installation location in the clip-on bracket 140 and that has a pull sufficient to trigger the Hall-effect sensor 180 when placed in close proximity thereto. The magnet 155 is positioned on the clip-on bracket 140 such that, once the clip-on eyepiece assembly 110 is attached to the digital imager 120, the magnet 155 is in close proximity to the Hall-effect sensor 180. In one example, the magnet 155 is a ⅛" diameter, 0.060" thick, nickel-plated, neodymium-iron-boron disk magnet with a pull of 0.6 lbs.

The Hall-effect sensor 180 is a transducer that outputs a ratiometric voltage in response to magnetic flux, and can be any conventional Hall-effect sensor, such as the A1395 SEHLT-T Linear Hall Effect Sensor manufactured by Allegro MicroSystems®, which for ease of implementation employs the inter-integrated circuit ($I^2C$) communications standard.

To attach the clip-on eyepiece assembly 110 to the digital imager 120, the user slides the T-mount 150 into the mounting rail 170 until the clip-on eyepiece assembly 110 snaps into place, e.g., via a detent (not shown). To detach the clip-on eyepiece assembly 110 from the digital imager 120, the user slides the T-mount 150 away from the mounting rail 170 with enough force to overcome the aforementioned detent.

Once the clip-on eyepiece assembly 110 is attached to the digital imager 120, the Hall-effect sensor 180 detects the flux of the magnet 155, which signals the digital imager 120 to automatically set parameters so that the digital imager 120 is configured for use with the eyepiece 130. Once the clip-on eyepiece assembly 110 has been detached from the digital imager 120, the Hall-effect sensor 180 no longer detects the flux of the magnet 155, and the digital imager 120 automatically sets parameters (e.g., via processor 190) so that the digital imager 120 is configured for use without the eyepiece 130. The method can be used to automatically set the parameters as described later with reference to FIG. 4.

The presence of the eyepiece 130 is detected by the combination of the magnet 155 and the Hall-effect sensor 180. The Hall-effect sensor 180 senses both the strength and the polarity of the magnetic field from the magnet 155. Accordingly, the magnet 155 is provided with a strength or orientation that identifies the eyepiece 130 as either an inverting eyepiece or a non-inverting eyepiece. Thereby, the digital imager 120 can detect not only whether the eyepiece 130 is attached, but also whether the eyepiece 130 is inverting or non-inverting. The Hall-effect sensor 180 comprises two integrated threshold voltage detectors (not shown), one that detects when the strength of a magnetic field exceeds a high threshold and another that detects when the strength of a magnetic field falls below a low threshold. The threshold voltages are provided to processor 190, which is configured (e.g., programmed) to process the voltage signals and configure the digital imager 120 based on the detected voltages. A low voltage threshold determines whether the clip-on bracket 140 has been installed.

When the clip-on bracket 140 has been installed, the output of the Hall-effect sensor 180 is below the low threshold, and the digital imager 120 is thereby informed (via processor 190) of the presence of the clip-on bracket 140. For both cases wherein the eyepiece 130 is inverting or non-inverting, the magnet 155 has a flux that is below the low threshold. The high threshold determines whether the eyepiece 130 that has been installed is non-inverting. The magnet 155 used for the eyepiece 130 that is non-inverting has a flux that is above the high threshold, and the magnet 155 used for the eyepiece 130 that is inverting has a flux that is below the high threshold.

Once the clip-on bracket 140 has been installed, the output of the Hall-effect sensor 180 is above the high threshold. In this case, the digital imager 120 via processor 190 sets certain parameters to configure the digital imager 120 for the case wherein the eyepiece 130 is non-inverting. For example, when the user 199 attaches the clip-on eyepiece assembly 110 in the case wherein the eyepiece 130 is non-inverting, the digital imager 120 will be automatically configured to invert the image on the display 160. When, once the clip-on bracket 140 has been installed, the output of the Hall-effect sensor 180 is below the high threshold, the digital imager 120 sets certain parameters to configure the digital imager 120 for the case wherein the eyepiece 130 is inverting.

Figure 2:
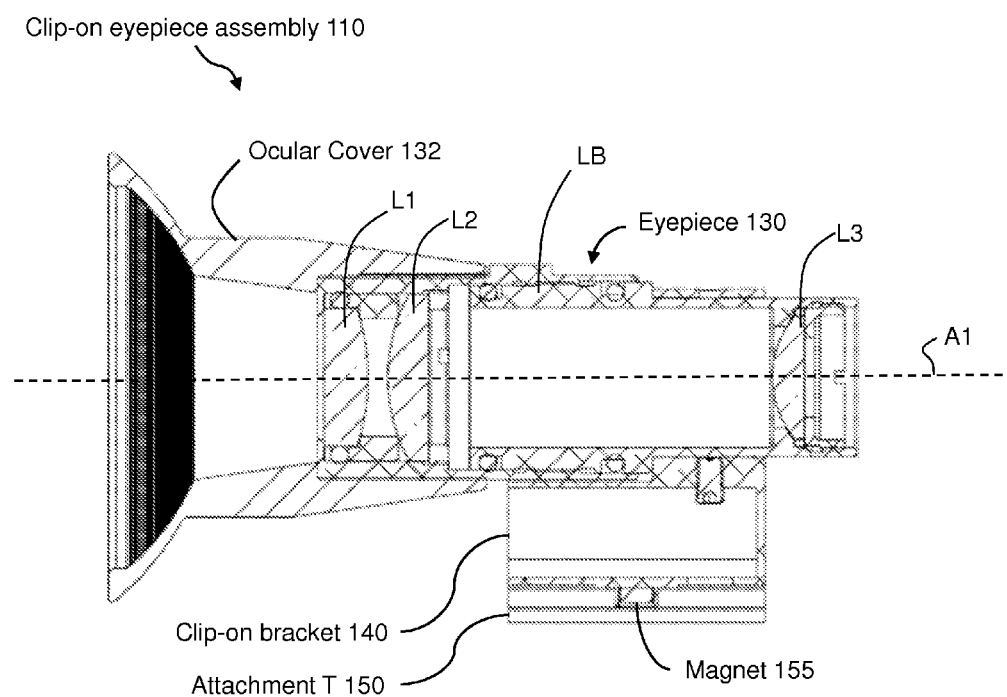
FIG. 2 is a cross-sectional drawing of an example clip-on eyepiece assembly according to the disclosure.

FIG. 2 is a cross-sectional drawing of the clip-on eyepiece assembly 110. The optical design of the eyepiece 130 is similar to that of a conventional eyepiece. Eyepiece 130 includes lens elements L1, L2 and L3 arranged along optical axis A1 and held in a lens barrel LB.

Figure 3:
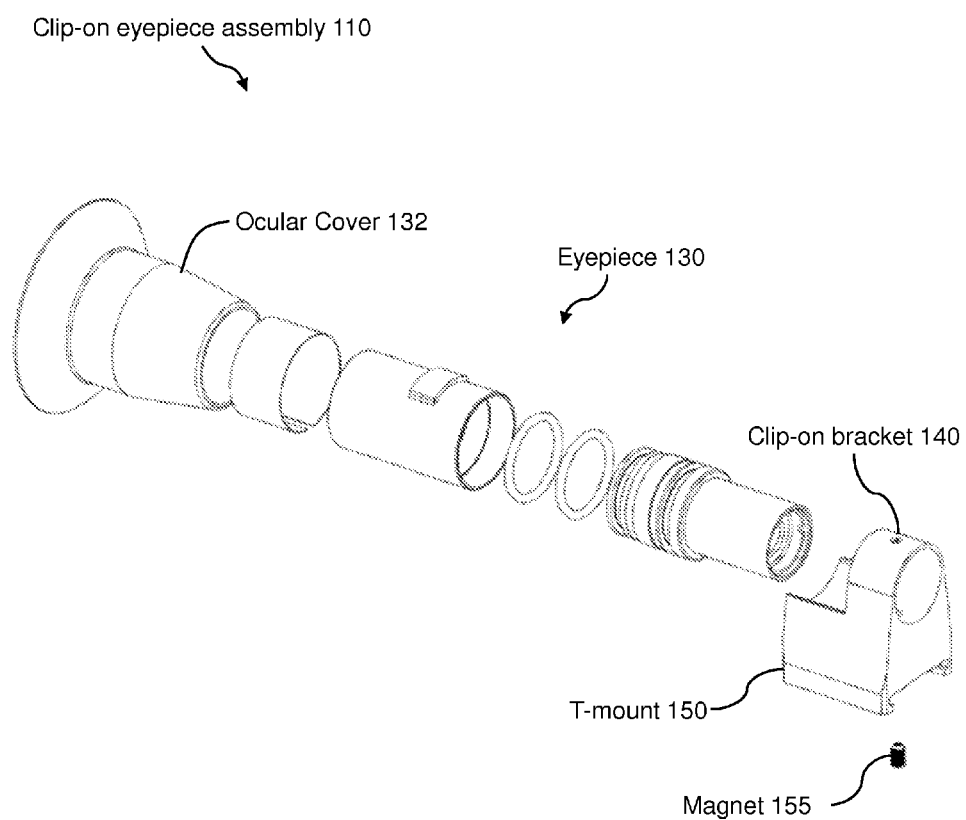
FIG. 3 is an exploded isometric view of an example clip-on eyepiece assembly according to the disclosure.

FIG. 3 is an exploded isometric view of the clip-on eyepiece assembly 110. The cylindrical shape of the opening of the clip-on bracket 140 into which the eyepiece 130 is inserted makes it possible for different eyepieces to be adopted as the eyepiece 130 used with the same clip-on bracket 140.

Figure 4:
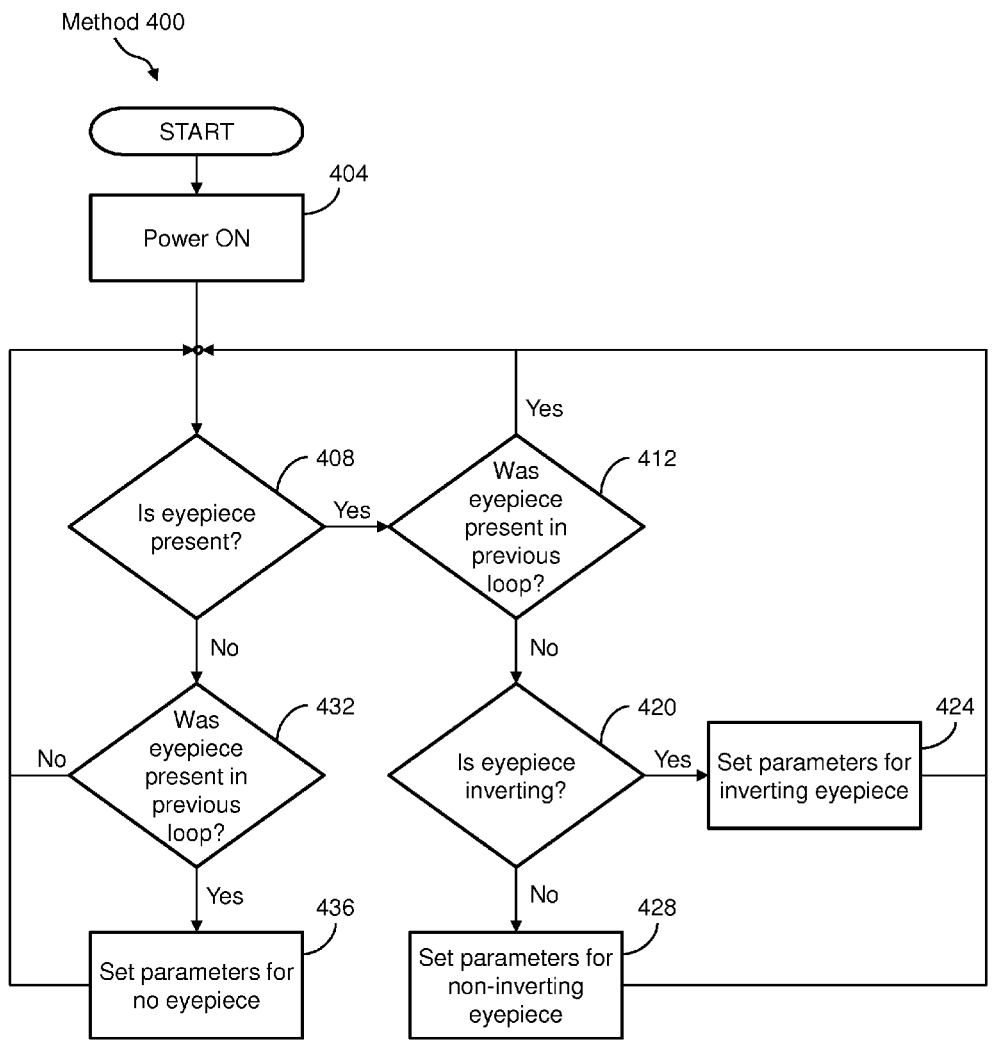
FIG. 4 is a flowchart of an example method of automatically configuring a digital imager to operate with the clip-on eyepiece assembly.

FIG. 4 is a flow chart of an example method 400 of automatically configuring the digital imager 120 to operate with the clip-on eyepiece assembly 110. The method 400 is performed by the processor 190 of the digital imager 120, wherein the digital imager 120 sets certain parameters when the user attaches or detaches the clip-on eyepiece assembly 110.

At a step 404, the digital imager 120 is powered on and a value $ATCH_{prev}$ (stored in the processor 190) is initialized to "No." The method then enters a main loop, which iterates until the digital imager 120 is powered off.

At a decision step 408, the processor 190 interrogates the Hall-effect sensor 180 to determine, based on the threshold voltages, whether the clip-on eyepiece assembly 110 is attached to the digital imager 120. If it is determined that the clip-on eyepiece assembly 110 is attached, then the method proceeds to a decision step 412; otherwise, the method proceeds to a decision step 432.

At the decision step 412, the processor 190 examines the value $ATCH_{prev}$, which indicates whether the clip-on eyepiece assembly 110 was attached in the previous iteration of the main loop. If $ATCH_{prev}$ equals "Yes"—indicating that the clip-on eyepiece assembly 110 was attached in the previous loop—then the method returns to the step 408 to perform the next iteration of the main loop. If $ATCH_{prev}$ equals "No"—indicating that the clip-on eyepiece assembly 110 was not attached in the previous loop—then $ATCH_{prev}$ is set to "No" and the method proceeds to a decision step 420.

At the decision step 420, the processor 190 interrogates the Hall-effect sensor 180 to determine whether the eyepiece 130 is an inverting eyepiece. If the eyepiece 130 is an inverting eyepiece, then the method proceeds to a step 424; otherwise, the method proceeds to a step 428.

At the step 424, the processor 190 sets certain parameters of the digital imager 120 in order to configure the digital imager 120 for use with an inverting eyepiece. Specifically, the processor 190 sets a parameter that defines the orientation of the image on the display 160 to "right-side up." In another embodiment, the processor 190 of the digital imager 120 sets additional parameters based on the fact that the eyepiece 130 is inverting. In one example, the processor 190 additionally adjusts the brightness of the display 160 in accordance with different ambient lighting conditions. After setting the parameters, the method returns to the step 408 and proceeds with the next iteration of the main loop.

At the step 428, the processor 190 sets certain parameters of the digital imager 120 in order to configure the digital imager 120 for use with a non-inverting eyepiece. Specifically, the processor 190 sets the parameter that defines the orientation of the image on the display 160 to "up-side down." In another embodiment, the processor 190 sets additional parameters based on the fact that the eyepiece 130 is non-inverting. After setting the configuration parameters, the method then returns to the step 408 and proceeds with the next iteration of the main loop.

At the decision step 432, the processor 190 examines the value $ATCH_{prev}$. If $ATCH_{prev}$ equals "No"—indicating that the clip-on eyepiece assembly 110 was not attached in the previous loop—then the method returns to the step 408 to perform the next iteration of the main loop. If $ATCH_{prev}$ equals "Yes"—indicating that the clip-on eyepiece assembly 110 was attached in the previous loop—then $ATCH_{prev}$ is set to "No" and the method proceeds to a step 436.

At the step 436, the processor 190 sets certain parameters of the digital imager 120 in order to configure the digital imager 120 for use with no eyepiece. The method then returns to the step 408 and proceeds with the next iteration of the main loop.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A clip-on eyepiece system, comprising: an eyepiece;
a clip-on bracket attached to said eyepiece and having a magnet that generates a magnetic field; and
a digital imager configurable for use in each of a handheld mode and a mounted mode, said digital imager including an attachment feature to which said clip-on bracket can be attached and a Hall-effect sensor arranged to sense a presence or absence of said magnetic field based on whether or not said eyepiece is mounted to said digital imager,
wherein, in response to said presence or absence of said magnetic field, said Hall-effect sensor generates a signal that puts said digital imager in either said handheld mode or said mounted mode; and
wherein said eyepiece is inverting or non-inverting, said signal from said Hall-effect sensor indicates whether said eyepiece is inverting or non-inverting, said digital imager generates an image, and said digital imager is configured to control an orientation of said image based on said signal from said Hall-effect sensor.

2. A clip-on eyepiece system according to claim 1, wherein said eyepiece includes an optical axis and said digital imager further includes:
an imaging optical system arranged to receive incoming light and form an image at a display;
a projector configured to project said image from said display to generate an output image; and
a light turning device arranged along said optical axis of said eyepiece in order to direct said output image into said eyepiece.

3. A clip-on eyepiece system according to claim 1, wherein said digital imager further includes a housing having a top side and said Hall-effect sensor resides immediately adjacent said top side of said housing.

4. A digital imager usable with a detachable eyepiece having a mount designed and
configured for removably securing the detachable eyepiece to the digital imager, the digital imager comprising:
a luminescent display designed and configured to display an image for viewing by a user;
an attachment feature designed and configured to removably engage the mount of the detachable eyepiece; and
a sensor arranged to generate a signal as a function of a proximity of the detachable eyepiece to said digital imager;
wherein said digital imager is designed and configured to adjust the display of the image on said luminescent display as a function of the signal generated by said sensor; and
wherein:
the detachable eyepiece is one of 1) an inverting type and 2) a non-inverting type;
said signal indicates whether the detachable eyepiece is the inverting type or the non-inverting type; and said digital imager is configured to control an orientation of said image relative to said luminescent display based on said signal.

5. A digital imager according to claim 4, wherein the detachable eyepiece includes an optical axis and said digital imager further includes:
an imaging optical system arranged to receive incoming light and form the image on said luminescent display;
a projector configured to project the image from said display to generate an output image; and
a light turning device arranged along said optical axis of said eyepiece in order to direct said output image into the detachable eyepiece when the detachable eyepiece is engaged with the digital imager.

6. A digital imager according to claim 5, wherein the digital imager is designed and configured to adjust one or more parameters of said luminescent display as a function of said signal.

7. A digital imager according to claim 6, wherein said one or more parameters include a brightness of said luminescent display.

8. A digital imager according to claim 6, wherein said one or more parameters include an orientation of said luminescent display.

9. A digital imager according to claim 4, wherein:
the detachable eyepiece includes a magnet that provides a magnetic field; and
said sensor comprises a magnetic-field sensor designed and configured to generate said signal in response to detecting the magnetic field.

10. A digital imager according to claim 9, wherein:
the detachable eyepiece is one of 1) an inverting type and 2) a non-inverting type;
the magnetic field has a first characteristic if the detachable eyepiece is of the inverting type and has a second characteristic different from the first characteristic if the detachable eyepiece is of the non-inverting type; and
said sensor is designed and configured to distinguish between the first and second characteristics and to generate differing versions of said signal depending on which of the first and second characteristics said sensor detects.

11. A digital imager according to claim 10, where the digital imager is designed and configured to determine orientation of said image relative to said luminescent display based on which version of said differing versions of said signal said sensor generates.

12. A digital imager according to claim 11, wherein said sensor comprises a Hall-effect sensor.

13. A digital imager according to claim 12, wherein the first characteristic is orientation of the magnetic field.

14. A digital imager according to claim 12, wherein the first characteristic is strength of the magnetic field.

15. A digital imager according to claim 4, wherein said digital imager further includes a housing having a side and said sensor resides adjacent said side of said housing.

16. A detachable eyepiece assembly for a digital imager having a magnetic sensor designed and configured to sense the presence of the detachable eyepiece to allow the digital imager to control display of an image formed by the digital imager, the detachable eyepiece assembly comprising:
an eyepiece designed and configured for allowing a user to view the image formed by the digital imager;
a mount secured to said eyepiece, said mount being designed and configured for detachably engaging said eyepiece with the digital imager in a manner that allows the user to view the image; and
a magnet configured to produce a magnetic field, said magnet being located on the detachable eyepiece assembly as a function of the magnetic sensor and being selected as a function of the magnetic sensor to identify the presence of the detachable eyepiece assembly on the digital imager; and
wherein the digital imager is designed and configured to distinguish between an inverting type eyepiece and a non-inverting type eyepiece depending on at least one characteristic of said magnetic field of said magnet, said magnet being selected to identify said eyepiece as being either the inverting type or the non-inverting type.

17. A detachable eyepiece assembly according to claim 16, wherein said at least one characteristic is orientation of said magnetic field.

18. A detachable eyepiece assembly according to claim 16, wherein said at least one characteristic is strength of said magnetic field.

* * * * *